United States Patent [19]
Addis

[11] 3,905,895
[45] Sept. 16, 1975

[54] FECAL EGG SEPARATOR

[76] Inventor: Tim Addis, Rural Rt. No. 2, Ava, Mo. 65608

[22] Filed: Nov. 23, 1973

[21] Appl. No.: 418,182

[52] U.S. Cl.................. 209/17; 209/173; 23/130 B; 23/292
[51] Int. Cl.² ............................................ B03B 7/00
[58] Field of Search..... 210/359, DIG. 24, 515–518, 210/83; 73/425.4 R, 425.2, 425; 141/327; 233/26, 2; 23/258.5, 230 B, 292; 209/2, 3, 5, 17, 162, 163, 173, 172, 250, 268, 273, 269, 237, 315

[56] References Cited
UNITED STATES PATENTS

| | | | |
|---|---|---|---|
| 2,928,591 | 3/1960 | Deaver............................ | 209/172 X |
| 3,300,051 | 1/1967 | Mitchell.............................. | 210/339 |
| 3,512,940 | 5/1970 | Shapiro............................... | 23/259 |
| 3,661,265 | 5/1972 | Greenspan......................... | 210/359 |
| 3,693,804 | 9/1972 | Grover................................ | 210/359 |
| 3,761,408 | 9/1973 | Lee..................................... | 233/26 X |
| 3,819,045 | 6/1974 | Greenwald........................... | 209/17 |

OTHER PUBLICATIONS

Bray's Clinical Laboratory Method, 6th Ed., C. U. Mosby Co., 1962, pp. 336–337.

Primary Examiner—Frank W. Lutter
Assistant Examiner—Ralph J. Hill
Attorney, Agent, or Firm—Lowe, Kokjer, Kircher

[57] ABSTRACT

A fecal egg separator is used to isolate parasite eggs contained in the fecal specimen of a small animal. The device consists of a generally cylindrical tube, a filter and a cap. The fecal specimen is scooped into the tube by the animal owner and taken to the animal clinic. Flotation solution is mixed with the specimen and the filter is pushed into the tube so that the eggs will float to the top through small holes in the filter as the tube is centrifuged or allowed to stand.

5 Claims, 5 Drawing Figures

PATENTED SEP 16 1975  3,905,895

FECAL EGG SEPARATOR

BACKGROUND OF THE INVENTION

Because a large number of small pets, principally dogs and cats, are infested with worms and other parasites, there is a need for a simple and inexpensive means for identifying the parasites troubling each animal so that the animal may be properly treated for its affliction. The subject fecal egg separator is utilized to collect a fecal sample from the animal and to separate the parasite eggs from the sample. The eggs can then be analyzed, both qualitatively and quantitatively, and the animal can be effectively treated on the basis of the analysis.

It has long been recognized that analyzing fecal specimens for parasite eggs is an effective method for identifying the parasites afflicting an aminal. A technique well suited for efficiently separating the eggs from the feces is the centrifugation technique, wherein the eggs are separated by placing the specimen in a tube, adding a solution to the tube, and placing the tube in a centrifuge machine. Another technique that can be employed is the flotation technique, wherein the specimen is mixed with a solution and allowed to stand long enough for the eggs to float to the top of the solution. A major feature of the subject device is that either of these techniques may be employed, depending upon the personal preference of the technician analyzing the sample. Because both techniques are highly effective, it is important that the device be versatile enough that it can be used with either technique.

The vessel for containing the fecal sample consists of an integral, leakproof tube to avoid the unpleasant possibility of fecal matter inadvertently escaping from it. For obvious reasons, it is highly desirable that such a device be disposable, and the minimization of the number of parts is essential if the production cost is to be kept at a practical level.

An object of the invention is to provide a unique, inexpensive, disposable device that is utilized for segregating the parasite ova contained in the feces of small animals.

Another object of the invention is to provide a device of the character described that is capable of use in either the centrifugation or flotation technique of separating ova from a fecal specimen.

Still another object of the invention is the minimization of the number of parts in aa device of the character described.

Yet another object is to provide, in a device of the character described, a leakproof tube for containing the fecal sample.

A further object of the invention is to provide, in a device of the character described, a filter that allows the ova, but not the fecal material, to pass through it.

A still further object of the invention is to provide, in a device of the character described, a cap that pushes the fecal material down into the tube when placed over the open end to seal the tube.

Other and further objects of the invention, together with the features of novelty appurtenant thereto, will appear in the course of the following description.

DETAILED DESCRIPTION OF THE INVENTION

In the accompanying drawings, which form a part of the specification and are to be read in conjunction therewith, and in which like reference numerals are employed to indicate like parts in the various views.

Figure 1:
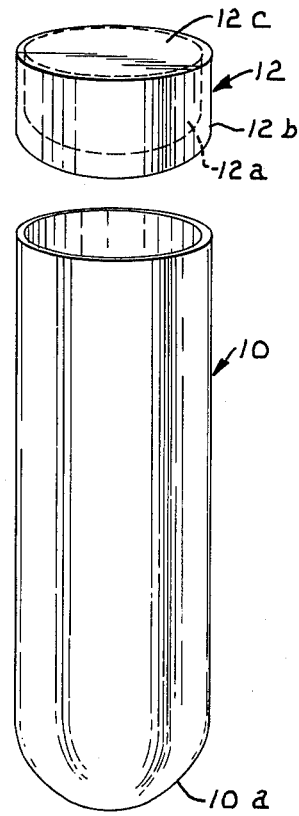
FIG. 1 is a perspective view of a preferred embodiment of the tube and the removed cap, with broken lines illustrating the structure of the cap.
Figure 2:
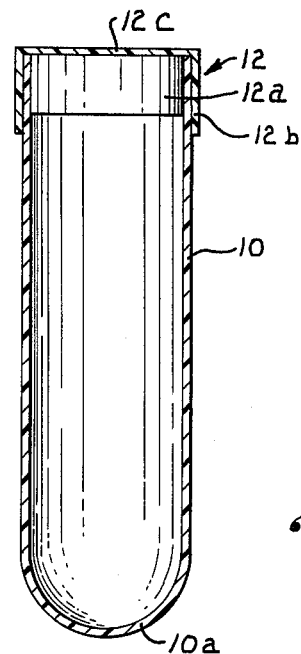
FIG. 2 is a cross sectional view of the tube with the cap inserted thereon.
Figure 3:
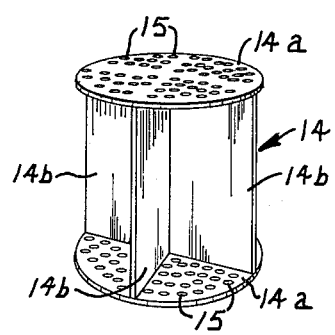
FIG. 3 is a perspective view of the first embodiment of the filter.

Referring now to the drawings in detail, the numeral 10 indicates the open ended, cylindrical tube that is used to contain the fecal specimen and flotation solution. Tube 10 preferably has a rounded bottom portion 10a or has sides that taper as they approach the bottom portion. The removable cap for the tube is generally designated by the numeral 12. Cap 12 includes a cylindrical inner portion 12a that fits snugly within tube 10 and a tubular outer portion 12b that fits snugly around tube 10. A top portion 12c of the cap fits entirely over the open end of tube 10 when cap 12 is inserted on the tube.

Figure 4:
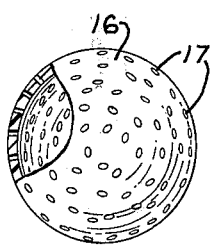
FIG. 4 is a perspective view of the second embodiment of the filter, with a portion broken away to illustrate its structure.
Figure 5:
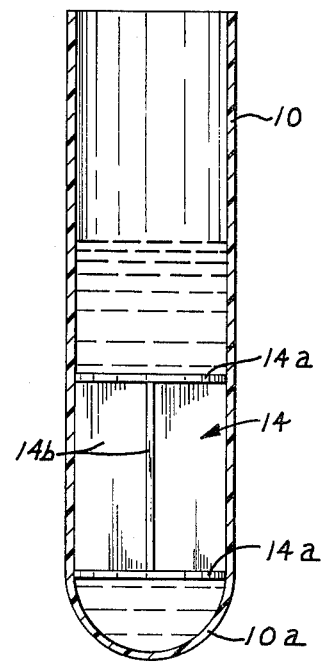
FIG. 5 is a cross sectional view of the tube with flotation solution having been added and the first embodiment of the filter having been inserted.

A first embodiment of the filter, indicated by the numeral 14, consists of upper and lower disc portions 14a and connecting ribs 14b. A number of small holes 15 extend through disc portions 14a. A second embodiment of the filter (FIG. 4) comprises a hollow sphere 16 with a number of small holes 17 through its shell. Alternative filters 14 and 16 fit snugly within tube 10 and are removable therefrom.

OPERATION

The tube 10 is used as a scoop by the animal owner to collect the fecal sample in a quick and sanitary manner. The cap 12 is placed over the open end of tube 10 to seal the tube for delivery to the animal clinic or laboratory, the cylindrical inner portion 12a pushing the fecal material down into tube 10.

The laboratory technician adds a proper flotation solution to tube 10 and thoroughly intermixes the flotation solution and the fecal sample. The particular flotation solution chosen is a matter of personal preference, and those skilled in the art are familiar with various conventional flotation solutions that have specific gravities suitable to exert a buoyant force on the ova. One of the alternative filters 14 or 16 is dropped into tube 10 and pushed near the bottom of the tube with an elongate stir stick. Since tube 10 has an integral bottom portion 10a, there is no possibility of leakage from tube 10 as the filter is inserted. The technician may then separate the ova from the fecal sample by either the centrifugation technique or the flotation technique, depending upon his preference.

If the centrifuation technique is chosen, tube 10, with the inserted filter 14 or 16, is placed in a centrifuge machine (preferably at about 1500 rpm) for approximately three minutes, the centrifugal action causing the ova to rise within the tube. Filters 14 and 16 contain holes 15 and 17, respectively, which are large enough to allow the ova to pass through the filter, but small enough that a large amount of fecal material does not flow to the top of the tube along with the ova. The isolated ova can then be removed from the top of the solution and placed on a microscope slide for identification.

If the flotation technique is chosen, tube 10 is completely filled with flotation solution so that a convex miniscus forms at the top of the tube. A coverslip is placed over the miniscus, and tube 10, with the inserted filter 14 or 16, is allowed to stand (in a test tube holder or the like) for 15 to 20 minutes. After this flotation period, the ova will have arisen to the coverslip through the holes in the filter. The coverslip is then transferred to a microscope slide and the isolated ova can then be identified.

Tube 10 is of the size of a standard test tube and its bottom portion 10a is preferably rounded, permitting it to fit into a standard centrifuge machine or test tube holder. Either of the alternative snugly fitting filters 14 or 16 may be utilized to effectively perform the filtering function. It should be noted that tube 10 and cap 12 are preferably constructed of transparent plastic, and it is contemplated that the device will be discarded after use.

From the foregoing, it will be seen that this invention is one well adapted to attain all the ends and objects hereinabove set forth, together with other advanatages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A device for collecting fecal material and receiving a solution added to said fecal material for the purpose of segregating the ova contained therein, said device comprising:
    a hollow receptacle for collecting and transporting said fecal material and for containing said solution, said receptacle having an open top end and a closed bottom end, said bottom end being integral with said receptacle to prevent the leakage of said solution therefrom; and
    a filter adapted to fit closely within said receptacle, said filter being of a configuration to present a pair of interconnected filtering surfaces, each having a plurality of holes sized to permit said ova to pass therethrough but substantially impeding the passage of fecal material therethrough.

2. A device as set forth in claim 1, including a removable cap for closing the open end of said receptacle during transport of said fecal material, said cap comprising:
    an inner cylindrical portion having a circular bottom, said cylindrical portion adapted to fit snugly within the upper portion of said receptacle;
    a tubular portion spaced radially outwardly from said cylindrical portion, said tubular portion adapted to snugly surround the upper portion of said receptacle; and
    a circular top portion interconnecting said cylindrical portion and said tubular portion.

3. A device as set forth in claim 1, wherein said filter comprises a pair of spaced discs forming said filtering surfaces and a pair of ribs interconnecting said discs to prevent said filter from becoming disoriented within said receptacle, said ribs extending substantially diametrically across said discs and intersecting with one another.

4. A method of collecting a specimen of fecal material in a receptacle and segregating the ova contained in said specimen, said method comprising the steps of:
    scooping said specimen into said receptacle;
    adding flotation fluid to said specimen;
    intermixing said specimen and said flotation fluid to obtain a suspension; centrifuging said receptacle to cause said ova to rise toward the top of said suspension; and
    filtering said ova through a pair of filtering surfaces each presenting a plurality of apertures sized to permit said ova to pass therethrough but substantially impeding the passage of fecal material therethrough, whereby said ova rise successively through said filtering surfaces to the top of said suspension for removal therefrom while said filtering surfaces impede the passage of fecal material.

5. A device for collecting fecal material and receiving a solution added to said fecal material for the purpose of segregating the ova contained therein, said device comprising:
    a hollow receptacle for collecting and transporting said fecal material and for containing said solution, said receptacle having an open top end and a closed bottom end, said bottom end being integral with said receptacle to prevent the leakage of said solution therefrom; and
    a filter in the form of a generally spherical shell sized to fit closely within said receptacle, said spherical shell having a hollow interior and presenting a plurality of holes sized to permit said ova to pass therethrough but substantially impeding the passage of fecal material therethrough.

\* \* \* \* \*